(12) United States Patent
Fujiwara et al.

(10) Patent No.: US 9,841,570 B2
(45) Date of Patent: Dec. 12, 2017

(54) OPTICAL FIBER ASSEMBLY, OPTICAL COUPLING DEVICE, AND OPTICAL FIBER COUPLING DEVICE

(71) Applicant: ADAMANT CO., LTD., Tokyo (JP)

(72) Inventors: Hiroyuki Fujiwara, Kawaguchi (JP); Kaoru Torii, Tokyo (JP); Masaru Sasaki, Kawaguchi (JP)

(73) Assignee: ADAMANT CO., LTD., Tokyo (JP)

( * ) Notice: Subject to any disclaimer, the term of this patent is extended or adjusted under 35 U.S.C. 154(b) by 37 days.

(21) Appl. No.: 15/301,769

(22) PCT Filed: Apr. 9, 2015

(86) PCT No.: PCT/JP2015/002015
§ 371 (c)(1),
(2) Date: Oct. 4, 2016

(87) PCT Pub. No.: WO2015/155994
PCT Pub. Date: Oct. 15, 2015

(65) Prior Publication Data
US 2017/0031111 A1  Feb. 2, 2017

(30) Foreign Application Priority Data
Apr. 10, 2014  (JP) .................................. 2014-081344

(51) Int. Cl.
*G02B 6/26* (2006.01)
*G02B 6/42* (2006.01)
(Continued)

(52) U.S. Cl.
CPC ......... *G02B 6/4206* (2013.01); *G02B 6/0006* (2013.01); *G02B 6/262* (2013.01);
(Continued)

(58) Field of Classification Search
CPC .... G02B 6/262; G02B 6/3624; G02B 6/0006; G02B 6/02209; G02B 6/02333
See application file for complete search history.

(56) References Cited

U.S. PATENT DOCUMENTS 4,737,011 A  4/1988  Iri et al.
6,485,191 B1  11/2002  Sato
(Continued)

FOREIGN PATENT DOCUMENTS

EP  0168261 A2  1/1986
EP  2479594 A1  7/2012
(Continued)

OTHER PUBLICATIONS

Jun. 30, 2015 International Search Report issued in International Patent Application No. PCT/JP2015/002015.
(Continued)

*Primary Examiner* — Thomas A Hollweg
*Assistant Examiner* — Mary A El Shammaa
(74) *Attorney, Agent, or Firm* — Oliff PLC

(57) ABSTRACT

An optical-fiber assembly, optical coupling device and optical-fiber coupling device provided with optical-fiber assembly. In the optical-fiber assembly, damaging a fixing material is prevented by preventing clad mode light from being incident on the fixing material and direct incidence, on the fixing material; of laser light emitted from a light-emitting element or an optical-fiber is prevented to generate resistance to the emitted light. The optical-fiber assembly constitutes by at least an optical-fiber and capillary. The optical-fiber is inserted into the capillary and one optical-fiber end is protruded outside the capillary. The optical-fiber outer periphery and capillary are fixed using fixing material and ceramic material disposed to be in contact with the entire optical-fiber outer circumference and have predetermined
(Continued)

contact length in the optical-fiber axial direction. The position at which the ceramic material is set in front of the position of the fixing material as viewed from one optical-fiber end.

6 Claims, 9 Drawing Sheets

(51) Int. Cl.
    *G02B 6/40*     (2006.01)
    *F21V 8/00*     (2006.01)
    *G02B 6/36*     (2006.01)

(52) U.S. Cl.
    CPC ............ *G02B 6/3624* (2013.01); *G02B 6/40* (2013.01); *G02B 6/42* (2013.01); *G02B 6/4296* (2013.01)

(56) References Cited

U.S. PATENT DOCUMENTS

| | | | |
|---|---|---|---|
| 2006/0140537 A1* | 6/2006 | Koishi | G02B 6/262 385/33 |
| 2010/0016845 A1* | 1/2010 | Hanley | A61B 18/24 606/15 |
| 2013/0011102 A1* | 1/2013 | Rinzler | G02B 6/3813 385/89 |
| 2013/0064515 A1* | 3/2013 | Shurgalin | A61B 18/22 385/125 |
| 2013/0331689 A1* | 12/2013 | Le | A61B 5/0084 600/425 |
| 2014/0010500 A1* | 1/2014 | Saito | G02B 6/3885 385/70 |

FOREIGN PATENT DOCUMENTS

| | | |
|---|---|---|
| FR | 2797058 A1 | 2/2001 |
| JP | S56-32809 U | 3/1981 |
| JP | S59-97110 A | 6/1984 |
| JP | S61-22009 U | 2/1986 |
| JP | H05-27707 U | 4/1993 |
| JP | 2001-083369 A | 3/2001 |
| JP | 2001-194623 A | 7/2001 |
| JP | 3530757 B2 | 5/2004 |
| JP | 2011-186399 A | 9/2011 |
| WO | 2012/098456 A1 | 7/2012 |

OTHER PUBLICATIONS

Oct. 12, 2016 International Preliminary Report on Patentability issued in International Patent Application No. PCT/JP2015/002015.

* cited by examiner

OPTICAL FIBER ASSEMBLY, OPTICAL COUPLING DEVICE, AND OPTICAL FIBER COUPLING DEVICE

TECHNICAL FIELD

The present invention relates to an optical fiber assembly and an optical coupling device or an optical fiber coupling device.

BACKGROUND ART

As a method for analyzing individual particles optically by dispersing fine particles in a fluid and by causing the fluid to flow thinly, a flow cytometry has been developed. As an excitation light source for the flow cytometer, a laser light source having a wavelength band ranging from the ultraviolet to the infrared has been put into practical use, and a high power laser beam of 50 mW or more is used as laser output. Moreover, an optical coupling device having such a laser light source, or an optical fiber coupling device for propagating a laser beam having a wavelength band ranging from the ultraviolet to the infrared has been developed.

The optical coupling device has a structure in which a light emitting end face of the light-emitting element housed in a housing as a laser light source and one end of the optical fiber are arranged so as to face each other in the housing, and further the other end of the optical fiber is drawn out to the outside of the housing. As the light-emitting element, a laser diode (LD), a super luminescent diode, or a solid laser such as a YAG laser is used.

On the other hand, the optical fiber coupling device is configured so that optical fibers each fitted with a ferrule are attached from both sides to the interior of a cylindrical case so as to face each other, and configured to optically couple the optical fibers together (e.g., see Patent Literature 1).

CITATION LIST

Patent Literature

Patent Literature 1: JP 3530757 B2

SUMMARY OF INVENTION

Technical Problem

In the conventional optical coupling device, the light emitted from the light-emitting element is converged by a lens and is optically coupled to the optical fiber. However, a coupling loss is caused due to mismatch of the mode field diameter (MFD) at the incidence end portion of the optical fiber or aberration of the lens or the like. Because of the coupling loss, a part of the emitted light that is converged is leaked into the clad of the optical fiber, or the emitted light having a larger numerical aperture (NA) than the NA of the core is incident on the core and a part of the emitted light leaks to the clad. A laser beam propagating in the clad layer (clad mode light) occurs due to the leakage of the emitted light to the clad.

Also in the optical fiber coupling device, the clad mode light occurs. The cause of the clad mode light in the optical fiber coupling device is mismatch of axis adjustment between the ends of optical fibers disposed facing each other, that is, the fact that the optical axes of the optical fibers do not match each other.

Even when clad mode light is generated in an optical coupling device or an optical fiber coupling device, the refractive index of air is smaller than the refractive index of the clad material at the outer periphery of the optical fiber where the outer periphery of the clad is in contact with the air. Accordingly, when the angle at which the clad mode light is incident on the clad outer circumferential surface is greater than the critical angle, the clad mode light is confined in the optical fiber. However when the outer periphery of the clad is fixed with a fixing material having a refractive index equal to or higher than the refractive index of the clad material (e.g., an adhesive, low-melting-point glass, or solder, etc.), the clad mode light is leaked from the clad to the fixing material. If the abovementioned high-power laser beam having laser output of 50 mW or more leaks as the clad mode light to the fixing material, the clad mode light is absorbed by the fixing material to cause a high temperature, and there is a problem that the fixing material is dissolved or burned to be damaged.

As a further problem, a high-power laser beam of 50 mW or more emitted from the light-emitting element is directly incident on the fixing material. An optical coupling device in which the optical fiber and the capillary or the like are fixed by the fixing material and further the fixing material is arranged on the incidence end portion side of the optical fiber will be described as an example, and in addition, the incident state of the laser beam in such an optical coupling device is shown in a conceptual diagram in FIG. 18. In the optical coupling device 100 based on FIG. 18, there is a possibility that a high-power laser beam emitted from a light-emitting element directly enters the fixing material 102 due to aberration of a lens (not shown), mismatch of the axis adjustment between a light-emitting element (not shown) and the incidence end portion of the optical fiber 101, or mismatch of axis adjustment between the lens and the incidence end portion of the optical fiber 101, or the like. And if such a laser beam is directly incident on the fixing material 102, there is a problem that the fixing material 102 is damaged by heat.

The present invention has been made in light of the above circumstances, an objective is to provide an optical fiber assembly that can prevent incidence of clad mode light on a fixing material so as to prevent damage to the fixing material and to provide the optical coupling device or the optical fiber coupling device which includes the optical fiber assembly.

Further, the present invention, in addition to the above objective, has an objective of providing an optical fiber assembly having resistance to light emitted from a light-emitting element or an optical fiber by preventing a laser beam emitted from the light-emitting element or the optical fiber from being incident on the fixing material directly, or providing an optical coupling device or an optical fiber coupling device equipped with the optical fiber assembly.

Solution to Problem

The abovementioned objectives are achieved by the following present invention. Namely, (1) an optical fiber assembly according to the present invention includes at least: an optical fiber; and a capillary having a through-hole in which the optical fiber is inserted, the optical fiber including: a core; and a clad which has a refractive index smaller than a refractive index of the core and which surrounds the core, wherein the optical fiber is inserted into the through-hole of the capillary and one end of the optical fiber is protruded to an outside of the capillary, the optical fiber assembly further including: a fixing material fixing an outer periphery of the optical fiber and the capillary together; and a ceramic material disposed so as to be in contact with an entire outer circumference of the optical fiber and to have a predetermined contact length in an axial direction of the optical fiber, wherein as viewed from the one end of the optical fiber, a position where the ceramic material is disposed is set in front of a position of the fixing material in contact with the outer periphery of the optical fiber.

(2) In an embodiment of the optical fiber assembly according to the present invention, light incident on the ceramic material is preferably scattered and the refractive index of the ceramic material is set equal to or higher than the refractive index of the clad.

(3) In another embodiment of the optical fiber assembly according to the present invention, the contact length is preferably 0.3 mm or more.

(4) In another embodiment of the optical fiber assembly according to the present invention, the fixing material is preferably disposed at an end of the through-hole on a side closer to the one end of the optical fiber, and the fixing material is preferably covered with the ceramic material.

(5) Further, an optical coupling device according to the present invention includes at least: the optical fiber assembly according to any one of (1) to (4); and a light-emitting element, wherein the one end is disposed opposite to the light-emitting element.

(6) Further, an optical fiber coupling device according to the present invention includes: a plurality of optical fiber assemblies including the optical fiber assembly according to any one of (1) to (4), wherein the one end of the optical fiber is disposed opposite to the one end of another optical fiber.

Advantageous Effects of Invention

According to the invention of claims 1, 5, and 6, (i.e., the abovementioned invention of (1), (5) and (6)), by scattering the clad mode light and by eliminating the scattered light in the axial direction of the optical fiber, the incidence of the clad mode light on the fixing material can be prevented, and the damage prevention to the fixing material becomes possible.

Further, according to the invention of claim 2 (i.e., the abovementioned invention of (2)), in addition to the effects possessed by the invention of claims 1, 5, and 6, a configuration is made so as to scatter the clad mode light while allowing the clad mode light to be incident on the ceramic material and to eliminate the scattered light in the axial direction of the optical fiber so as not to allow the clad mode light to enter the fixing material by setting the refractive index of the ceramic material equal to or higher than the refractive index of the clad. Therefore, damage to the fixing material can be prevented more securely.

Further, according to the invention of claim 3 (i.e., the abovementioned invention of (3)), in addition to the effect possessed by the invention described in each claim, the contact length of the ceramic material with respect to the optical fiber periphery, required for preventing leakage of the clad mode light to the fixing material has been found to be at 0.3 mm or more. Therefore, it becomes possible to prevent damage to the fixing material more securely by reliably scattering the clad mode light to eliminate the scattered light in the axial direction of the optical fiber.

Further, according to the invention of claim 4 (i.e., the abovementioned invention of (4)), in addition to the effect possessed by the invention described in each claim, since the light emitted from a light emission element or an optical fiber subjected to coupling leakage is diffusely reflected on the ceramic material surface, the emitted light is prevented from directly being incident on the fixing material, and a resistance to light emitted from a light-emitting element or an optical fiber is provided, and thereby damage to the fixing material can be prevented.

DESCRIPTION OF EMBODIMENTS

First Embodiment

Figure 1:
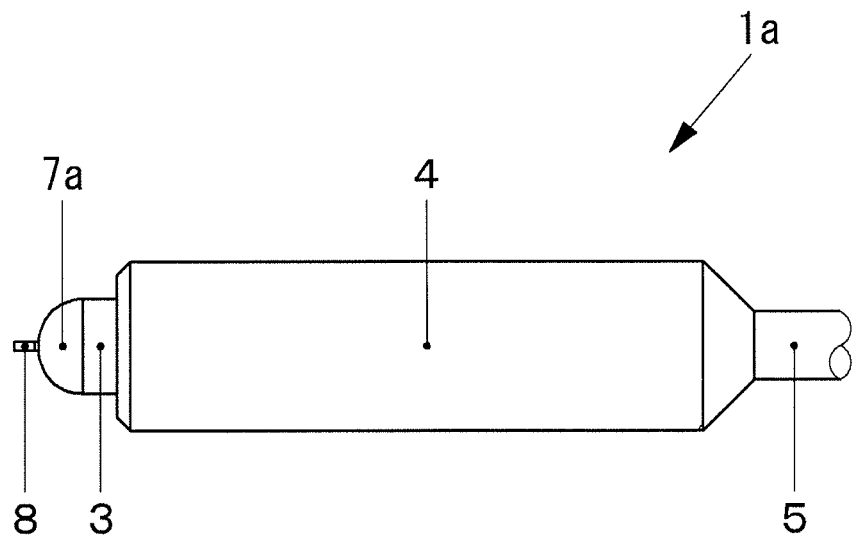
FIG. 1 is a schematic diagram showing a configuration of an optical fiber assembly according to a first embodiment of the present invention.
Figure 2:
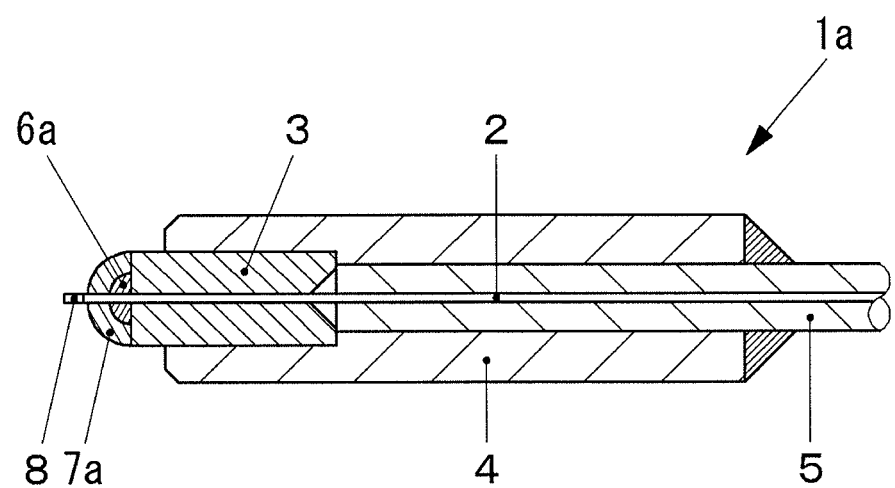
FIG. 2 is a cross-sectional view showing schematically the configuration of the optical fiber assembly according to the first embodiment of the present invention.
Figure 3:
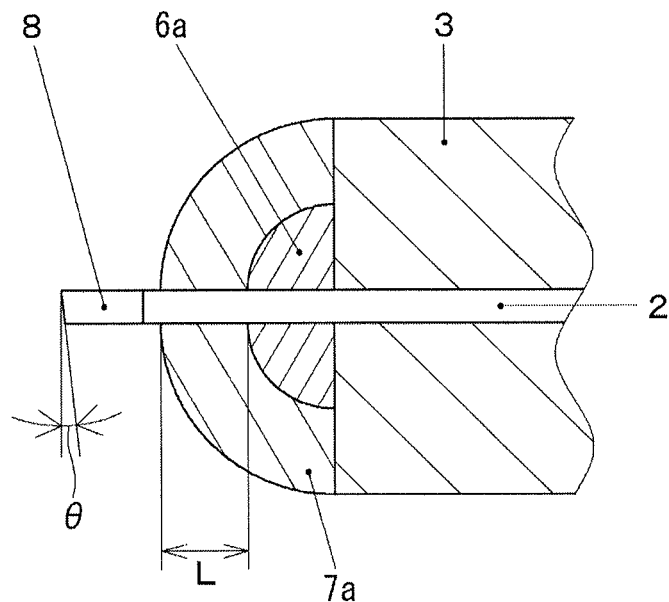
FIG. 3 is an enlarged partial cross-sectional view around one end side of the optical fiber of the optical fiber assembly according to the first embodiment of the present invention.

Hereinafter, a first embodiment of an optical fiber assembly according to the present invention will be described with reference to FIGS. 1 to 3. FIG. 1 is a schematic diagram showing a configuration of an optical fiber assembly 1a according to the first embodiment of the present invention, and FIG. 2 is a cross-sectional view schematically showing the configuration of the optical fiber assembly 1a, and FIG. 3 is an enlarged partial cross-sectional view around one end side of an optical fiber 2 in the optical fiber assembly 1a. Incidentally, hatching in the optical fiber 2 and an end cap 8 to be described later is omitted giving priority to visibility in FIGS. 2 and 3.

The optical fiber assembly 1a is composed of at least the optical fiber 2 and a capillary 3, and further composed of a sleeve 4 holding the capillary 3 with an end of the capillary 3 slightly protruded, as the main portion thereof.

The optical fiber 2 has an element wire portion (strip portion) where a covering 5 is removed and the element wire is exposed over a predetermined length from one end as the incidence end portion. The strip portion is inserted into the capillary 3. The optical fiber 2 is constituted by a core and a clad which has a refractive index smaller than the refractive index of the core and surrounds the core, and a single-mode fiber and a multimode fiber, or a polarization maintaining fiber is used.

An optical fiber made of a quartz material is used as the single-mode fiber. The refractive index of the clad is 1.4585 at a wavelength of 587.56 nm, 1.4498 at a wavelength of 1060.00 nm, and 1.4447 at a wavelength of 1500.00 nm as an example, and the refractive index of the clad is set to be smaller than the refractive index of the core.

An optical fiber of the refractive index distribution type or step index type, which is constituted of quartz material is used as the multimode fiber. In the present invention, an optical fiber formed of a core and a clad having a smaller refractive index than the refractive index of the core and surrounding the periphery of the core is intended to include also multi-mode fiber of the refractive index distribution type.

Further, the polarization maintaining fiber is an optical fiber capable of propagating light while maintaining the linearly polarized state (so-called Polarization Maintaining Fiber (PMF)). Further, an example of the interior of the element wire 16 includes a core 16a composed of a quartz material and having a large refractive index, a clad 16b which is formed concentrically around the core 16a and is composed of a quartz material having a relatively small refractive index smaller than that of the core 16a, and two stress imparting portions 16c provided in the clad 16b as shown in FIG. 13.

The stress imparting portions 16c are symmetrically disposed around the core 16a in the clad 16b, and its cross section is circular. Further, its refractive index is smaller than that of the clad 16b. A material having a larger thermal expansion coefficient than that of the clad 16b is used for the stress imparting portion 16c, and particularly $B_2O_3$—$SiO_2$ glass is used.

Figure 13:
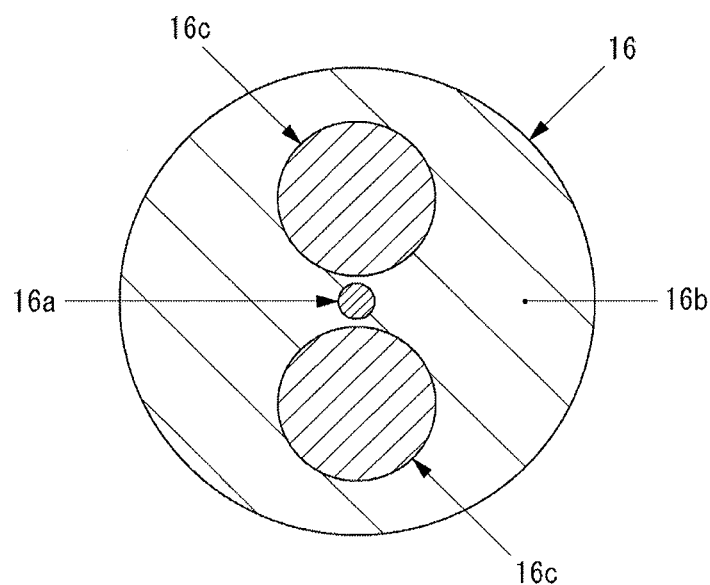
FIG. 13 is a cross-sectional view of polarization maintaining fiber taken along the plane perpendicular to the optical axis, provided in the optical fiber assembly according to the present invention.

An optical fiber other than the panda-type such as one shown in FIG. 13 may also be used for the PMF, and for example, a PMF having an elliptic core, a compressed oval type PMF, or a bow-tie PMF containing the panda-type is also available.

The capillary 3 is formed in a cylindrical shape with a through-hole formed parallel to the longitudinal direction at its center. Further, the optical fiber 2 is inserted into the through-hole, and the capillary 3 holds one end of the optical fiber 2 with the one end of the optical fiber 2 protruded to the outside of the capillary 3.

As the material of the capillary 3, oxide ceramic materials such as zirconia and alumina, and as others, non-oxide ceramic materials such as silicon carbide, silicon nitride and aluminum nitride, and glass materials such as borosilicate glass and crystallized glass, and in addition, plastics materials and other metal materials and the like can be cited.

In particular, zirconia is widely used among these materials and is the most preferred as the material of the capillary 3 since zirconia allowed micropores to be processed with high accuracy, and is resistant to thermal environmental change, and further its adhesive force is strong when bonded to the optical fiber 2 through an epoxy adhesive.

The capillary 3 into which the optical fiber 2 is inserted and the covering 5 are inserted into a hole of the sleeve 4. Since the outer diameters of the capillary 3 and the covering 5 are different from each other, the stepped portion for insertion of the covering 5 and insertion of the capillary 3 is provided on the inner peripheral surface of the hole of the sleeve 4. Note that the contour of the sleeve 4 is formed in a cylindrical shape.

Figure 8:
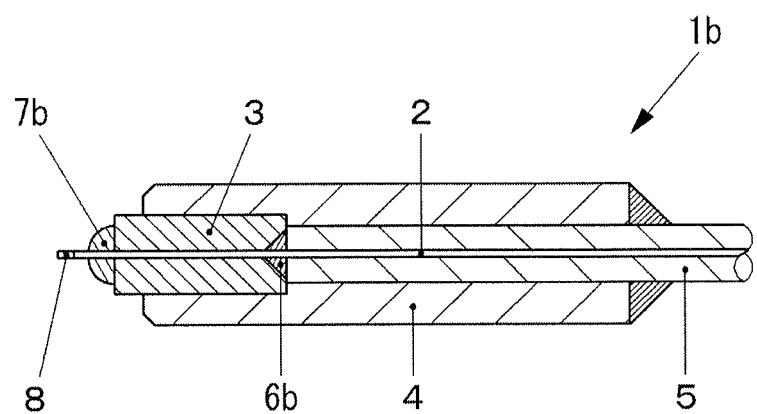
FIG. 8 is a cross-sectional view schematically showing a configuration of the optical fiber assembly according to the second embodiment of the present invention.

The outer periphery of the optical fiber 2 inserted in the through-hole and the capillary 3 are fixed with a fixing material 6a. The outer periphery of the optical fiber 2 and the capillary 3 may be fixed by placing the fixing material 6a to an end of the through-hole on the side closer to the one end of the optical fiber 2 as shown in FIG. 2, by placing a fixing material 6b at the end of the through-hole on the side closer to the other end of the optical fiber 2 as shown in FIG. 8 to be described later, by placing a fixing material to the gap between the inner diameter of the through-hole and the outer periphery of the optical fiber 2, or by a combination of these. The optical fiber assembly 1a will be described taking a case where the fixing material 6a is disposed on the end of the through-hole on the side closer to the one end of the optical fiber 2 as shown in FIG. 2 for example. An adhesive, low-melting-point glass, solder or the like is used for the fixing material 6a. In the present invention, a fixing material having a refractive index greater than that of the clad material of the optical fiber 2 as a refractive index at a wavelength band ranging from the ultraviolet to the infrared may be used. It becomes possible to widely select the fixing material regardless of refractive index, and it becomes possible to achieve simplification of the design and manufacturing of the optical fiber assembly 1a.

As the adhesive, an epoxy adhesive (epoxy resin adhesive) and a photocurable adhesive such as a UV adhesive, an inorganic adhesive (in particular, an adhesive using a metal alkoxide as a binder), or the like can be used. However in particular an epoxy adhesive is preferred in view of the filling properties into the through-hole of the capillary 3, the adhesive force (adhesive strength), heat-resisting environment characteristics, curing properties and the like. It should be noted that a filler (filling material) may be mixed into the adhesive.

As the low-melting-point glass, PbO—$B_2O_3$-based low-melting-point glass having a thermal expansion coefficient of $7 \times 10^{-6}$ (/° C.), or lead-free low-melting-point glass may be used.

In addition, the bonding materials such as Au—Sn, Au—Ge and In—Pb—Ag are used as the solder, and the bonding material may be fixed to the optical fiber 2 which is provided with a Ti—Pt—Au sputtering film and plated with Ni—Au and the capillary 3.

As described above, the fixing material 6a is disposed at an end of the through-hole on the side closer to the one end of the optical fiber 2, and further the exposed surface of the fixing material 6a is covered with a ceramic material 7a in addition. The ceramic material 7a is provided in contact with the entire outer circumference of the optical fiber 2, and in addition, is arranged with a predetermined contact length L in the axial direction of the optical fiber 2 as shown in FIG. 3. Hence, as viewed from one end of the optical fiber 2, the position of the ceramic material 7a is set in front of the position of the fixing material 6a which is in contact with the outer periphery of the optical fiber 2.

The ceramic material 7a has a refractive index set equal to or higher than the refractive index of the clad of the optical fiber 2 (in particular, a clad outer periphery) in the wavelength band ranging from the ultraviolet to the infrared (range of 200 nm to 6000 nm inclusive). Further, the ceramic material 7a is intended to include all ceramic materials having characteristics of scattering and eliminating the light entering the interior of the ceramic material 7a. Specifically alumina, zirconia, gray alumina, titania, alumina-titania and the like can be cited. An example of the specific refractive index of the ceramic material 7a includes 1.76 to 1.77. Therefore, when the clad mode light is incident on one end of the optical fiber 2, the present invention permits the clad mode light to be incident on the inside of the ceramic material 7a since the ceramic material 7a has a refractive index equal to or greater than that of the clad.

The contact length L of the ceramic material 7a and the outer periphery of the optical fiber 2 shown in FIG. 3 may be set freely, but it is particularly preferable to set 0.3 mm or more. The reason is that the leakage of incident light to the fixing material 6a disposed in back of the ceramic material 7a can be prevented more reliably by scattering clad mode light incident on the interior of the ceramic material 7a, by attenuating the scattered clad mode light inside the ceramic material 7a, and by eliminating the clad mode light propagating to the exterior of the ceramic material 7a in the axial direction of the optical fiber 2. Incidentally, it is not necessary to extend the contact length L to the portion where scattering of the clad mode light does not occur in the interior of the ceramic material 7a, and as the extent capable of preventing the leakage of the clad mode light to the fixing material 6a, the contact length L is more practically about 0.5 mm to 1.0 mm.

For the application of the ceramic material 7a, an adhesive of ceramic base material which is paste in the normal temperature range (5° C. to 35° C. inclusive) is coated on the fixing material 6a, and heated at 100° C. to be cured so that the fixing material 6a is covered with the ceramic material 7a.

Further, in the present embodiment, an end cap 8 is fixed to the end face of one end side of the optical fiber 2. The end cap 8 is formed of an undoped quartz material of the coreless structure having a single refractive index, and in addition, its refractive index is set equivalent to the refractive index of the core of the optical fiber 2. Further, the contour is formed in a cylindrical shape and is set to have the same diameter as the optical fiber 2. The optical fiber 2 and the end cap 8 are fixed by fusion at each end.

Further, the end of the end cap 8 is polished at an angle θ (4 degrees to 8 degrees) with respect to the plane perpendicular to the optical axis of the optical fiber 2 to be formed in an inclined shape as shown in FIG. 3. An optical polishing process is performed on the end face, and in addition, anti-reflection (AR) coat is applied so that the optical fiber assembly 1a of which coupling loss is small is achieved while Fresnel reflection from the end face is suppressed.

It should be noted that in place of the end cap 8, a multi-mode fiber with a large core may be used.

Figure 4:
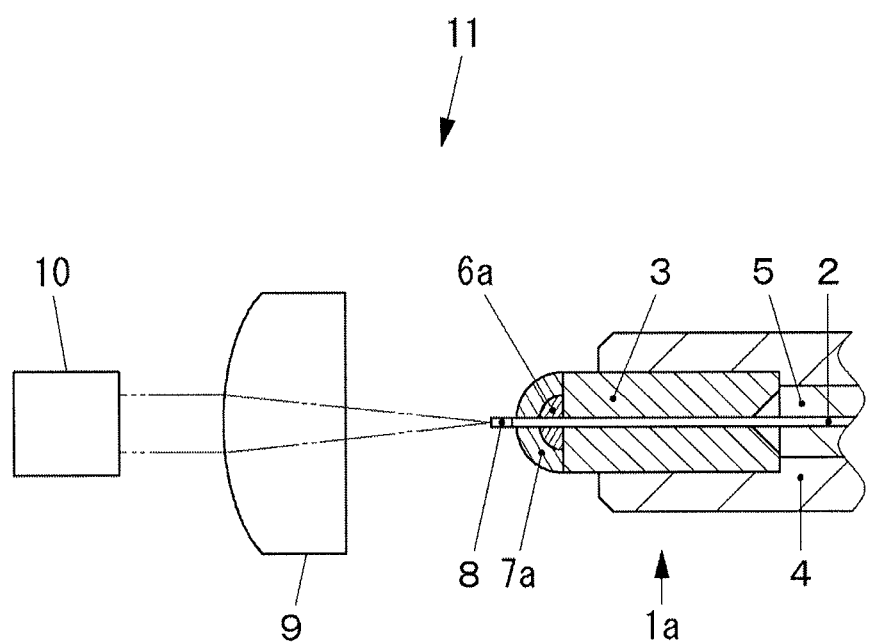
FIG. 4 is a schematic view of an optical coupling device using an optical fiber assembly according to the first embodiment of the present invention.

A schematic view of an optical coupling device 11 using the above optical fiber assembly 1a is shown in FIG. 4. In FIG. 4, the optical fiber assembly 1a is shown in a cross-sectional diagram. However, placing priority on visibility, hatching of the optical fiber 2 and the end cap 8 is omitted. The optical coupling device 11 is formed of at least the optical fiber assembly 1a and a light-emitting element 10 as shown in FIG. 4, and one end of the optical fiber 2 and the end face of the end cap 8 are disposed so as to face the light-emitting element 10. Further, FIG. 4 illustrates the optical coupling device 11 in which a lens 9 is disposed on one end side of the optical fiber 2 and the end face of the one end side is arranged opposite to a lens 9.

The lens 9 (an example is a convex lens as shown) converges a laser beam emitted from the light emitting element 10 on the optical surface, and focuses the beam on the end face of the end cap 8 (or one end of the optical fiber 2 when there is no end cap 8). Further, the focus is set substantially at the center of the end face of the end cap 8 (on the optical axis of the optical fiber 2 when there is no end cap 8).

On the other hand, the light-emitting element 10 is a light source which has a wavelength band ranging from the ultraviolet to the infrared and oscillates a high-power laser beam with laser output equal to or higher than 50 mW, and a LD, a super luminescent diode, or a solid-state laser such as a YAG laser or the like is used.

The optical coupling device 11 is manufactured by housing the light-emitting element 10 in a housing (not shown), positioning the center of the end face of the end cap 8 at the focal position of the laser beam by the lens 9 with a high degree of accuracy, and further by fixing the optical fiber assembly 1a with a supporting part (not shown) in the housing.

Figure 5:
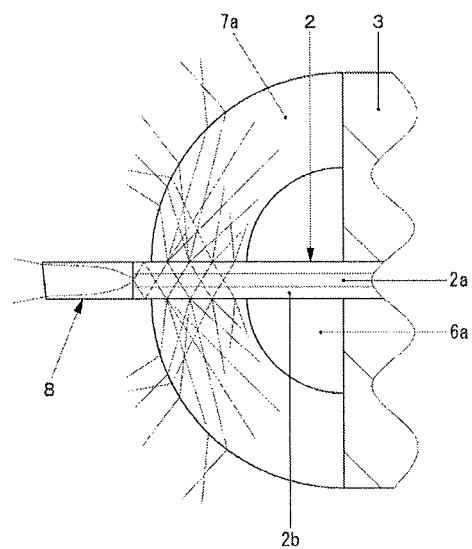
FIG. 5 is a schematic view showing an enlarged cross-section around one end side of the optical fiber and a scattering state of clad mode light of the optical fiber assembly according to the first embodiment.

FIG. 5 is a schematic view showing an enlarged cross-section in the vicinity of one end of the optical fiber 2 in the optical fiber assembly 1a and geometrically showing a state in which at least a part of the laser beam emitted from the light-emitting element 10 propagates as a clad mode light in the optical fiber 2, and the clad mode light scatters inside the ceramic material 7a. Incidentally, in order to ensure the visibility of the scattering state of the clad mode light, the hatching of each portion other than the capillary 3 is omitted.

First, a laser beam having a wavelength band ranging from the ultraviolet to the infrared is emitted from the light-emitting element 10. The emitted laser beam is converged by the lens 9 to be incident on the end face of the end cap 8, and further is incident on the optical fiber 2. In an ideal case, since the positioning of the lens 9 with respect to the laser beam emitted from the light-emitting element 10 and positioning between the lens 9 and the end face of the end cap 8 have been carried out accurately, the converged light is incident on the center of the end face of the end cap 8. When the converged light from the lens 9 is incident on the end cap 8, the laser beam propagates in the interior of the end cap 8, and is incident on one end of the optical fiber 2 within a predetermined numerical aperture NA to propagate in the interior of a core 2a while being totally reflected at an angle equal to or less than the critical angle.

However, when the aberration occurs in the lens 9, or positioning between the light-emitting element 10 and the lens 9 or positioning (axis adjustment) between the lens 9 and the end face of the end cap 8 is not accurate, the laser beam is refracted at the end face of the end cap 8 depending on the degree, and propagates inside after changing the angle of incidence and enters the optical fiber 2 as shown in FIG. 5. The laser beam incident on the end cap 8 is made incident on the optical fiber 2 while being refracted slightly inside the end cap 8, and a laser beam in which mismatch of the MFD has occurred or a laser beam having a larger numerical aperture NA than the NA of the core 2a is made incident on the optical fiber 2 so that the clad mode light is generated.

As shown in FIG. 5, on the outer periphery of a clad 2b in contact with the air, since the refractive index of air (approximately 1.00) is smaller than the refractive index of the clad 2b (approximately 1.47 from the above description), when the angle of incidence of the clad mode light on the outer peripheral surface of the clad is greater than the critical angle, the clad mode light is confined in the optical fiber 2. However, when the clad mode light propagates to the portion where the outer periphery of the clad 2b is in contact with the ceramic material 7a, the clad mode light is incident on the interior of the ceramic material 7a disposed in front of the fixing material 6a because the refractive index of the ceramic material 7a is set equal to or higher than the refractive index of the clad 2b.

The clad mode light incident on the interior of the ceramic material 7a is scattered inside the ceramic material 7a, and further the scattered clad mode light is attenuated inside the ceramic material 7a. Since viewed from one end of the optical fiber 2, the ceramic material 7a is located in front of the fixing material 6a, the clad mode light is scattered and attenuated inside the ceramic material 7a. Furthermore, since the ceramic material 7a is in contact with the optical fiber 2 throughout a predetermined contact length L in the axial direction of the optical fiber 2, while being attenuated within the ceramic material 7a, the clad mode light is gradually attenuated in the axial direction of the optical fiber 2. As described above, in the axial direction of the optical fiber 2, the clad mode light propagating to the exterior of the ceramic material 7a is scattered, and the scattered light in the axial direction of the optical fiber 2 is eliminated so that the incidence of the clad mode light on the fixing material 6a is prevented, and thereby it becomes possible to prevent damage to the fixing material 6a.

Further, by setting the refractive index of the ceramic material 7a equal to or higher than the refractive index of the clad 2b, a configuration is made so that the clad mode light is scattered while being allowed to be incident on the ceramic material 7a, and by eliminating the scattered light in the axial direction of the optical fiber 2, the clad mode light is not allowed to be incident on the fixing material 6a. Therefore, damage to the fixing material 6a can be prevented more securely.

The contact length L may be set to a predetermined length to the extent that the effect of leakage prevention of the clad mode light to the fixing material 6a can be obtained. The present applicant has found by verification that, in particular, the length to completely prevent the leakage of the clad mode light to the fixing material 6a needs to be 0.3 mm or more. Therefore, by setting the contact length L to at least 0.3 mm, the clad mode light is scattered more reliably and the scattered light in the axial direction of the optical fiber 2 is eliminated, and then it becomes possible to prevent the damage to the fixing material 6a more securely.

Further, in the optical fiber assembly 1a, an exposed portion of the fixing material 6a is covered with the ceramic material 7a so that the ceramic material 7a is located in front of the fixing material 6a. Accordingly, the laser beam is diffusely reflected on the surface of the ceramic material 7a, and is not incident on the fixing material 6a when a high-power laser beam emitted from the light-emitting element 10 is directly emitted in the direction of the fixing material 6a, because of the aberration of the lens 9, because of mismatch of the axis adjustment between the light-emitting element 10 and the incidence end portion (or the end face of the end cap 8) of the optical fiber 2, or because of mismatch of the axis adjustment between the lens 9 and the incidence end portion (or the end face of the end cap 8) of the optical fiber 2, or the like. Therefore, by being diffusively reflected, light emitted from the light-emitting element 10 subjected to coupling leakage is prevented from being directly incident on the fixing material 6a, and a resistance to light emitted from the light-emitting element 10 is provided, and thereby it is becomes possible to avoid damage to the fixing material 6a.

Figure 6:
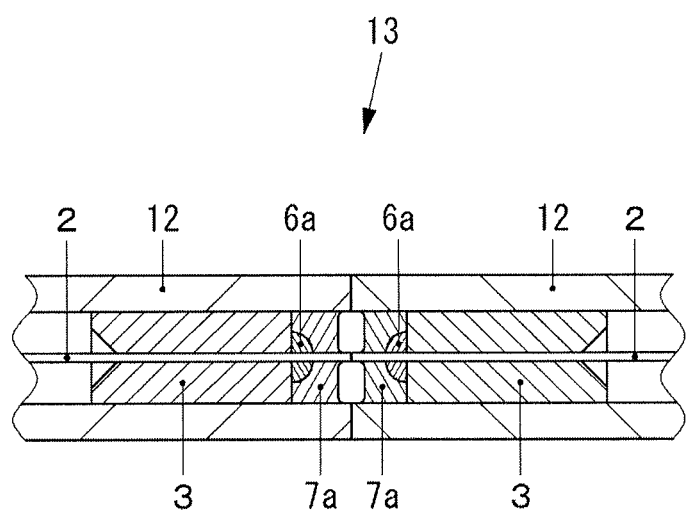
FIG. 6 is a cross-sectional view showing an example of an optical fiber coupling device using the optical fiber assembly according to the first embodiment of the present invention.

Further, as shown in FIG. 6, an optical fiber coupling device 13 may be constituted by providing a plurality of optical fiber assemblies 1a arranged in a plurality of cylindrical cases 12 so that the ends of optical fibers 2 face each other. It should be noted that the same number is given to the same portion of the optical coupling device 11, and redundant description will be omitted or simplified. FIG. 6 illustrates the optical fiber coupling device 13 in which the core axes of the optical fibers 2 are disposed on the same straight line and the ends of the optical fibers 2 arranged opposite to each other are in contact with each other, as one example of the optical fiber coupling device. Note that also in FIG. 6, placing priority on visibility, hatching in the optical fiber 2 and the end cap 8 is omitted. As a matter of course, the ends of the optical fibers 2 may be separated and further an optical element such as a collimating lens, a filter, or an optical isolator may be arranged between the separated optical fibers 2.

In the optical fiber coupling device 13, because of mismatch of axis adjustment between the ends of optical fibers 2, there is a case in which the clad mode light is generated by coupling of a laser beam having a NA larger than the NA of the core of each optical fiber 2 or coupling of the laser beam in which the MFD mismatch has occurred. However, since the ceramic material 7a is placed in front of the fixing material 6a in each optical fiber 2, the clad mode light is scattered, attenuated, and eliminated inside the ceramic material 7a, and incidence of the clad mode light on the fixing material 6a is prevented, and then damage to the fixing material 6a is prevented, similarly to the optical coupling device 11.

Further, even if a laser beam emitted from one optical fiber 2 is directly emitted in the direction of the fixing material 6a of the other optical fiber 2 by mismatch of the axis adjustment between the ends of the optical fibers 2, the laser beam is diffusely reflected on the surface of the ceramic material 7a. Accordingly, the emitted light can be prevented from being directly incident on the fixing material 6a, it becomes possible to prevent damage to the fixing material 6a with resistance to the emitted light provided.

Second Embodiment

Figure 7:
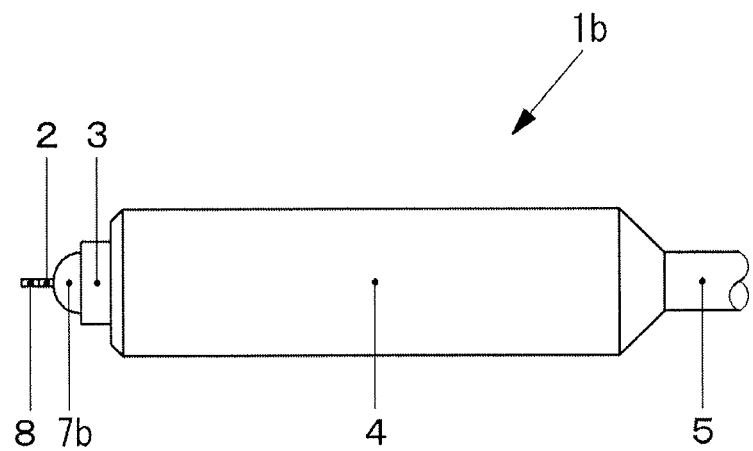
FIG. 7 is a schematic diagram showing a configuration of an optical fiber assembly according to a second embodiment of the present invention.

Next, a second embodiment of an optical fiber assembly according to the present invention will be described with reference to FIGS. 7 to 9, and also the configuration and operation of an optical coupling device using an optical fiber assembly of the second embodiment will be described with reference to FIGS. 10 to 11. Further, the configuration and operation of the optical fiber coupling device using an optical fiber assembly of the second embodiment will be described with reference to FIG. 12. It should be noted that, the same parts as parts in the first embodiment are denoted by the same numbers, and redundant description will be omitted or simplified. Even in FIGS. 8 to 10 and 12, giving priority to visibility, hatching in the optical fiber 2 and the end cap 8 is omitted. Further, hatching of each portion other than the capillary 3 in FIG. 11 is omitted.

An optical fiber assembly 1b according to the second embodiment is different from the abovementioned optical fiber assembly 1a in that the fixing material 6b is arranged on the end of the through-hole of the capillary 3 on the other end side opposite to the one end side of the optical fiber 2, and further in that only a ceramic material 7b is arranged on the end of the through-hole on the side closer to the one end of the optical fiber 2.

Fixing of the outer periphery of the optical fiber 2 and the capillary 3 in the optical fiber assembly 1b is carried out by placing the fixing material 6b at the end of the through-hole on the side closer to the other end of the optical fiber 2 as shown in FIG. 8. An adhesive or solder may be used for the fixing material 6b. However, since there is a possibility that the covering 5 of the optical fiber 2 burns due to the heating temperature, it is desirable to refrain from using the low-melting-point glass at the position of the fixing material 6b.

Figure 9:
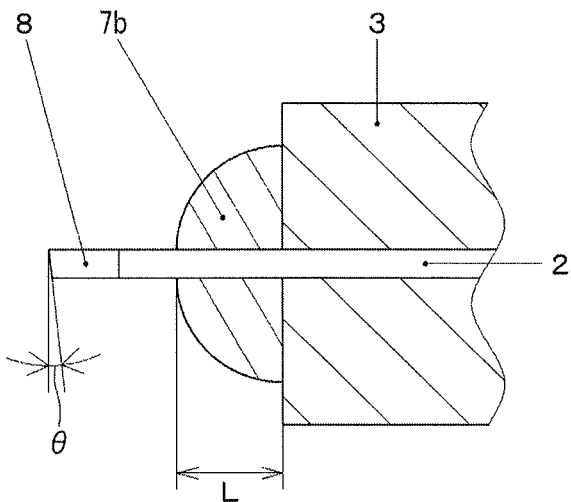
FIG. 9 is an enlarged partial cross-sectional view around one end side of the optical fiber of the optical fiber assembly according to the second embodiment of the present invention.

The ceramic material 7b is provided so as to be in contact with the entire outer circumference of the optical fiber 2, and is arranged with a predetermined contact length L in the axial direction of the optical fiber 2 as shown in FIG. 9. Hence, viewed from one end of the optical fiber 2, the position of the ceramic material 7b is set in front of the position of the fixing material 6b in contact with the outer periphery of the optical fiber 2.

Also the ceramic material 7b, similarly to the ceramic material 7a, has a refractive index set equal to or higher than the refractive index of the clad of the optical fiber 2 (in particular, a clad outer periphery) in a wavelength band ranging from the ultraviolet to the infrared. Furthermore, the ceramic material 7b includes all the ceramic materials having characteristics of scattering and eliminating the light incident on the interior of the ceramic material 7b. Thus, when clad mode light is incident on one end of the optical fiber 2, the clad mode light enters the interior of the ceramic material 7b.

The application of the ceramic material 7b is performed by heating an adhesive of the ceramic base material which is paste in the normal temperature range (5° C. to 35° C. inclusive), at 100° C. for curing after the adhesive is applied to the end of the through-hole of the capillary 3 on the side closer to the one end of the optical fiber 2.

Figure 10:
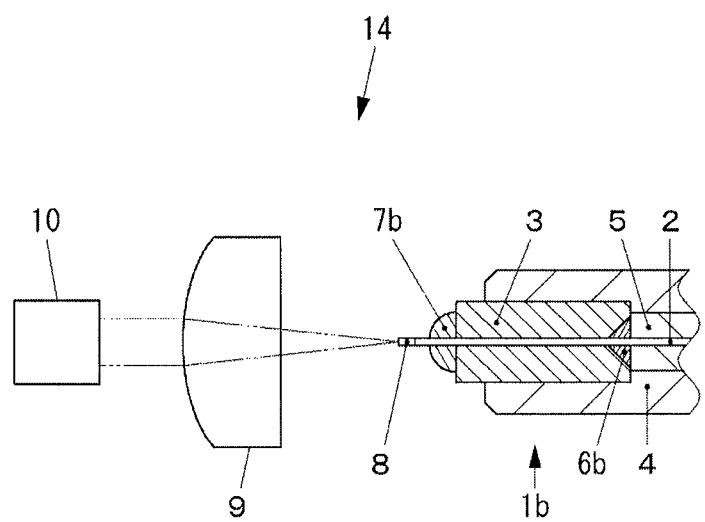
FIG. 10 is a schematic view of an optical coupling device using the optical fiber assembly according to the second embodiment of the present invention.
Figure 11:
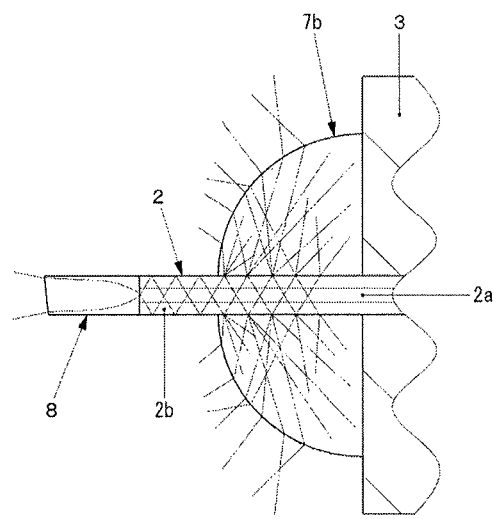
FIG. 11 is a schematic view showing an enlarged cross-section around one end side of the optical fiber and a scattering state of clad mode light in the optical fiber assembly of the second embodiment.

When the clad mode light is generated even in an optical coupling device 14 in FIG. 10 in the same manner as the optical coupling device 11, since the refractive index of air (approximately 1.00) is smaller than the refractive index of the clad 2b (approximately 1.47) at the outer periphery of the clad 2b in contact with the air, in the case where the angle at which the clad mode light is incident on the clad outer peripheral surface is greater than the critical angle, the clad mode light is confined in the optical fiber 2, as shown in FIG. 11. However, when having propagated to the portion where the outer periphery of the clad 2b is in contact with the ceramic material 7b, the clad mode light is incident on the interior of the ceramic material 7b disposed in front of the fixing material 6b because the refractive index of the ceramic material 7b is set equal to or higher than the refractive index of the clad 2b.

Clad mode light incident on the interior of the ceramic material 7b is scattered inside the ceramic material 7b and is attenuated. Further, since the ceramic material 7b is in contact with the optical fiber 2 throughout a predetermined contact length L in the axial direction of the optical fiber 2, the clad mode light is gradually attenuated in the axial direction of the optical fiber 2. Hence, the scattered light in the axial direction of the optical fiber 2 is eliminated, and the incidence of the clad mode light on the fixing material 6b is prevented, and the damage prevention for the fixing material 6b becomes possible.

Figure 12:
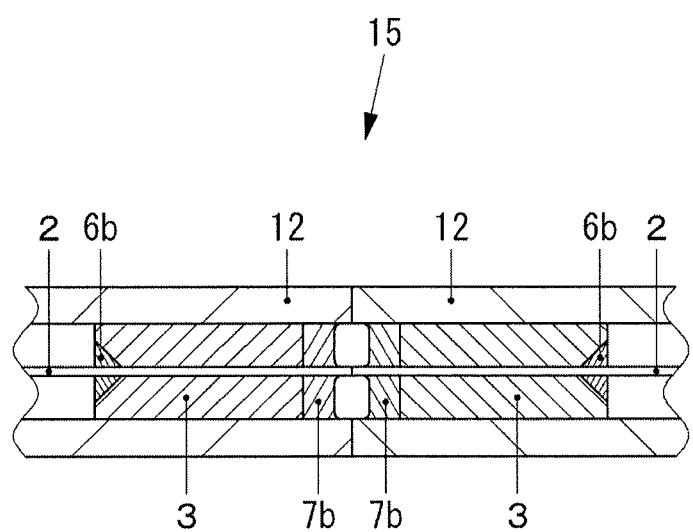
FIG. 12 is a cross-sectional view showing an example of an optical fiber coupling device using the optical fiber assembly according to the second embodiment of the present invention.

Also in an optical fiber coupling device 15 in FIG. 12, due to mismatch of the axis adjustment between the ends of the optical fibers 2 to each other, there is a case where the clad mode light is generated by coupling of the laser beam having a larger NA than the NA of the core of each optical fiber 2 and coupling of the laser beam in which mismatch of the MFD has occurred. However, since the ceramic material 7b is placed in front of the fixing material 6b in each of the optical fibers 2, the clad mode light is scattered, attenuated and eliminated inside the ceramic material 7b similarly to the optical coupling device 14, and incidence of the clad mode light on the fixing material 6b is prevented so that damage to the fixing material 6b is prevented.

EXAMPLE

Hereinafter a description of an example of the present invention will be given, but the present invention is not limited to the following example. An optical fiber assembly according to the present example had a configuration of the optical fiber assembly 1a shown in FIG. 2, and a polarization maintaining fiber of the panda-type was used as the optical fiber. Further, PbO—$B_2O_3$-based low-melting-point glass was used as the fixing material, and alumina was used as the ceramic material. Further, the contact length L was set within the range of 0.5 mm to 1.0 mm throughout the entire circumference of the optical fiber. On the other hand, for the light-emitting element, a light source having a blue band of wavelengths 405, 450 and 488 nm, and having laser output of 50 mW was used.

Figure 14:
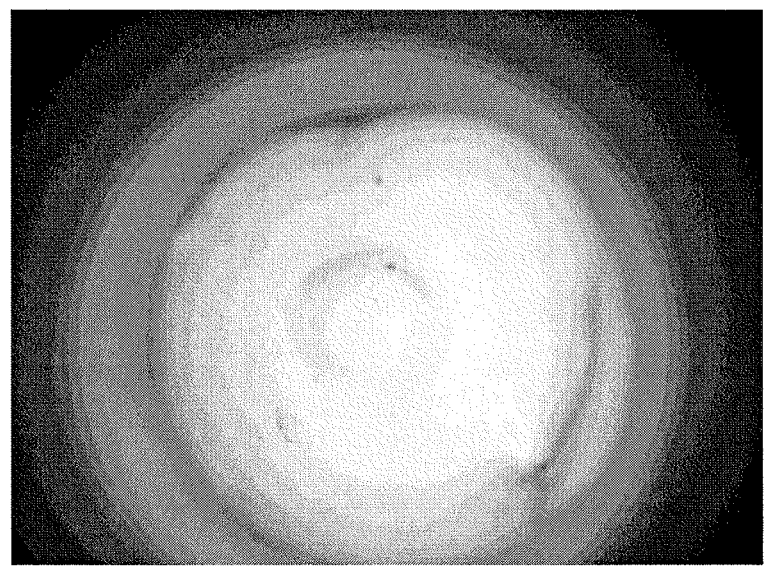
FIG. 14 is a photograph showing a state of alumina in an example.

The laser beam was made incident on the optical fiber from the light source, and the state of the alumina was observed by propagating the clad mode light inside the optical fiber. The state of the alumina is shown in FIG. 14. No changes were observed in the state of alumina in FIG. 14, and no changes were observed also in the low-melting-point glass. Thus, the clad mode light was confirmed to have been scattered and eliminated inside the alumina.

Further, the resistance was evaluated by making the laser beam incident directly on the alumina surface from the light source and focus on the alumina surface. As a result, the laser beam was diffusely reflected on the alumina surface, and it was observed that no changes occurred to the state of the alumina, as shown in FIG. 14. Hence, an evaluation result indicating that the present example was provided with resistance to light emitted from the light source was obtained.

Comparative Example

Then as a comparative example, an optical fiber assembly excluding the ceramic material 7a from the optical fiber assembly 1a shown in FIG. 2, was prepared as a sample.

Except for the presence or absence of a ceramic material, the same configuration as the previous example was prepared. Note that the same light source as the example was used as the light-emitting element.

Figure 15:
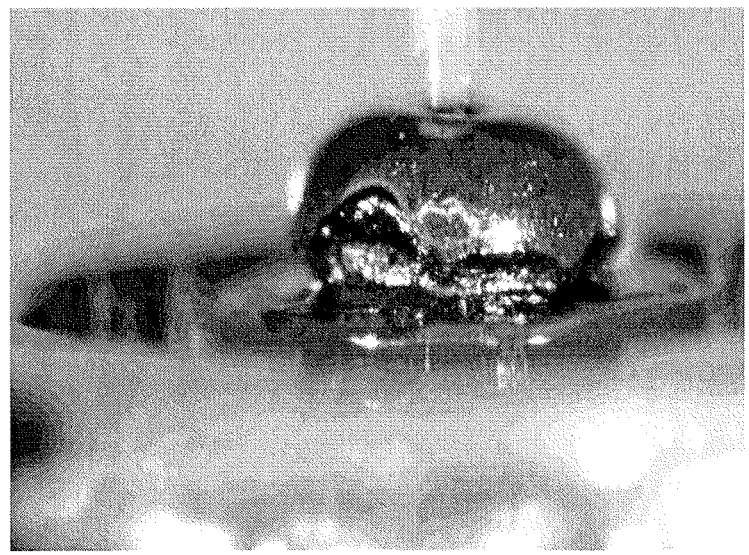
FIG. 15 is an enlarged photograph of low-melting-point glass on which clad mode light is incident in a comparative example.

The laser beam was made incident on the optical fiber from the light source and the state of the low-melting-point glass was observed after propagating clad mode light inside the optical fiber. The state of the low-melting-point glass is shown in FIG. 15. In FIG. 15, blackening of the low-melting-point glass was observed. Thus, the occurrence of damage on fixing material due to the leakage of the clad mode light was confirmed.

Figure 16:
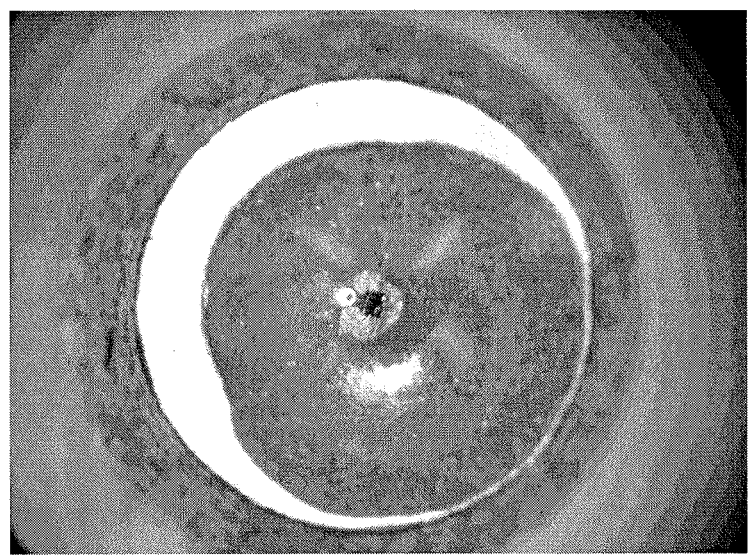
FIG. 16 is a photograph showing a surface state of the low-melting-point glass before direct irradiation of a laser beam in the comparative example.
Figure 17:
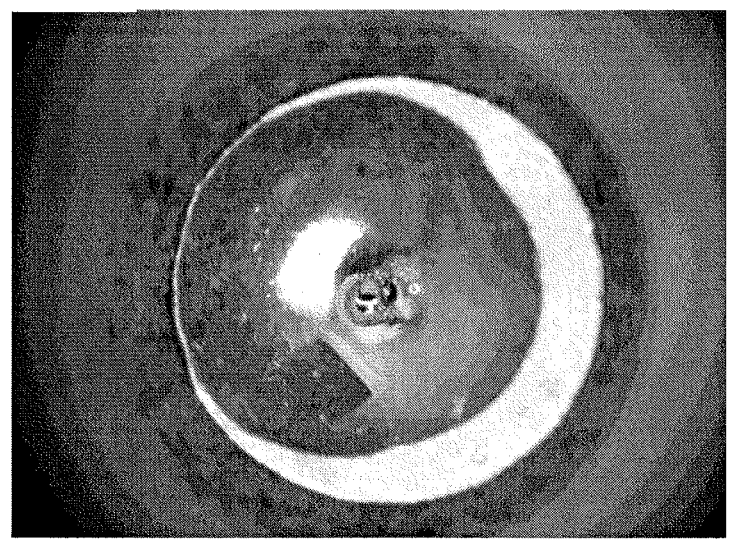
FIG. 17 is a photograph showing a surface state of the low-melting-point glass after the direct irradiation of the laser beam in the comparative example.
Figure 18:
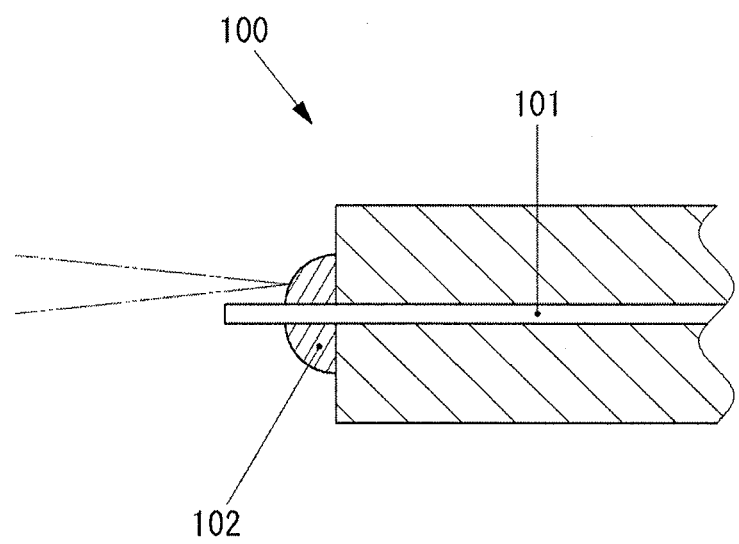
FIG. 18 is a conceptual diagram showing a state of a laser beam directly incident on the fixing material in the optical coupling device.

Further, the resistance was evaluated by making the laser beam incident on the low-melting-point glass from a light source directly so that the laser beam focused on the surface of the low-melting-point glass. FIG. 16 shows a surface state of the low-melting-point glass before direct irradiation of the laser beam and FIG. 17 shows a surface state of the low-melting-point glass after the direct irradiation of the laser beam. As shown in FIG. 17, blackening occurred on the laser beam condensing section of the low-melting-point glass surface after the laser beam irradiation and the white precipitate was observed on the periphery thereof. Accordingly, the evaluation result indicating that resistance to light emitted from the light source was not provided was obtained in the comparative example.

As described above, according to the respective evaluation results of the example and the comparative example, the arrangement of the ceramic material so as to have the contact length L has been confirmed to be effective in terms of the damage prevention of the fixing material against the clad mode light, and in terms of imparting the resistance of the fixing material to the direct incident light from the light-emitting element.

REFERENCE SIGNS LIST 1a, 1b optical fiber assembly
2 optical fiber
2a core
2b clad
3 capillary
4 sleeve
5 covering
6a, 6b fixing material
7a, 7b ceramic material
8 end cap
9 lens
10 light-emitting element
11, 14 optical coupling device
12 case
13, 15 optical fiber coupling device
16 element wire of polarization maintaining fiber
16a core of polarization maintaining fiber
16b clad of polarization maintaining fiber
16c stress imparting portion of polarization maintaining fiber
L contact length between outer periphery of optical fiber and ceramic material
θ inclination angle of end cap end

The invention claimed is:

1. An optical fiber assembly comprising at least:
an optical fiber; and
a capillary having a through-hole in which the optical fiber is inserted, the optical fiber comprising:
a core; and
a clad which has a refractive index smaller than a refractive index of the core and which surrounds the core, wherein
the optical fiber is inserted into the through-hole of the capillary and one end of the optical fiber, comprising an incidence end portion of the optical fiber, is protruded to an outside of the capillary, the optical fiber assembly further comprising:
a fixing material fixing an outer periphery of the optical fiber and the capillary together; and
a ceramic material disposed so as to be in contact with an entire outer circumference of the optical fiber and to have a predetermined contact length in an axial direction of the optical fiber, wherein
as viewed from the one end of the optical fiber, a position where the ceramic material is disposed is set in front of a position of the fixing material in contact with the outer periphery of the optical fiber.

2. The optical fiber assembly according to claim 1, wherein
light incident on the ceramic material is scattered and the refractive index of the ceramic material is set equal to or higher than the refractive index of the clad.

3. The optical fiber assembly according to claim 1, wherein
the contact length is 0.3 mm or more.

4. The optical fiber assembly according to claim 1, wherein
the fixing material is disposed at an end of the through-hole on a side closer to the one end of the optical fiber, and the fixing material is covered with the ceramic material.

5. An optical coupling device comprising at least:
the optical fiber assembly according to claim 1; and
a light-emitting element, wherein
the one end is disposed opposite to the light-emitting element.

6. An optical fiber coupling device comprising:
a plurality of optical fiber assemblies including the optical fiber assembly according to claim 1, wherein
the one end of the optical fiber is disposed opposite to the one end of another optical fiber.

* * * * *